Feb. 19, 1924. 1,484,071
S. J. MEMMEN
APPARATUS FOR USE IN WASHING AUTOMOBILES
Filed April 17, 1922 2 Sheets-Sheet 1
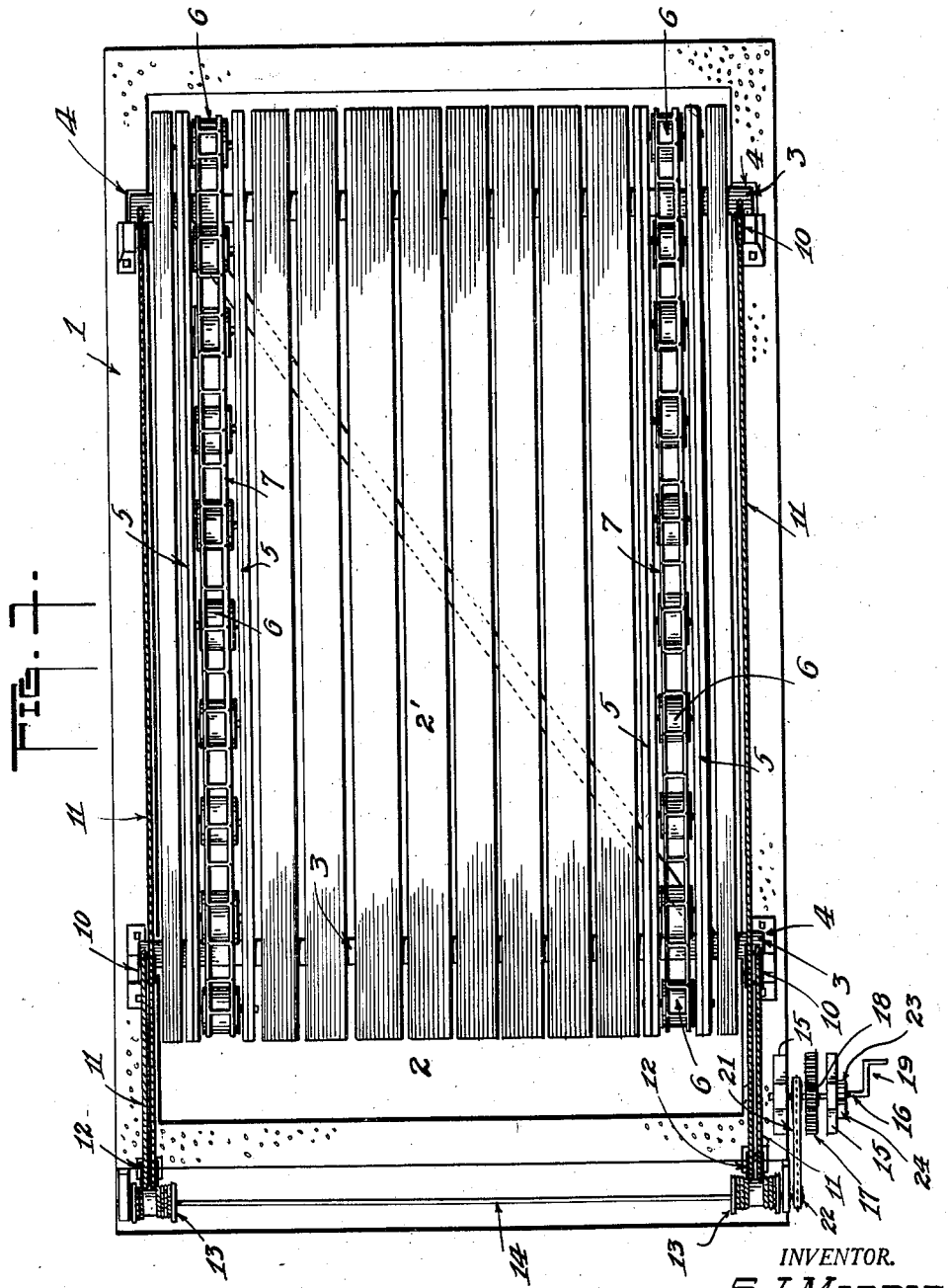
INVENTOR.
S. J. Memmen,
BY
ATTORNEY.

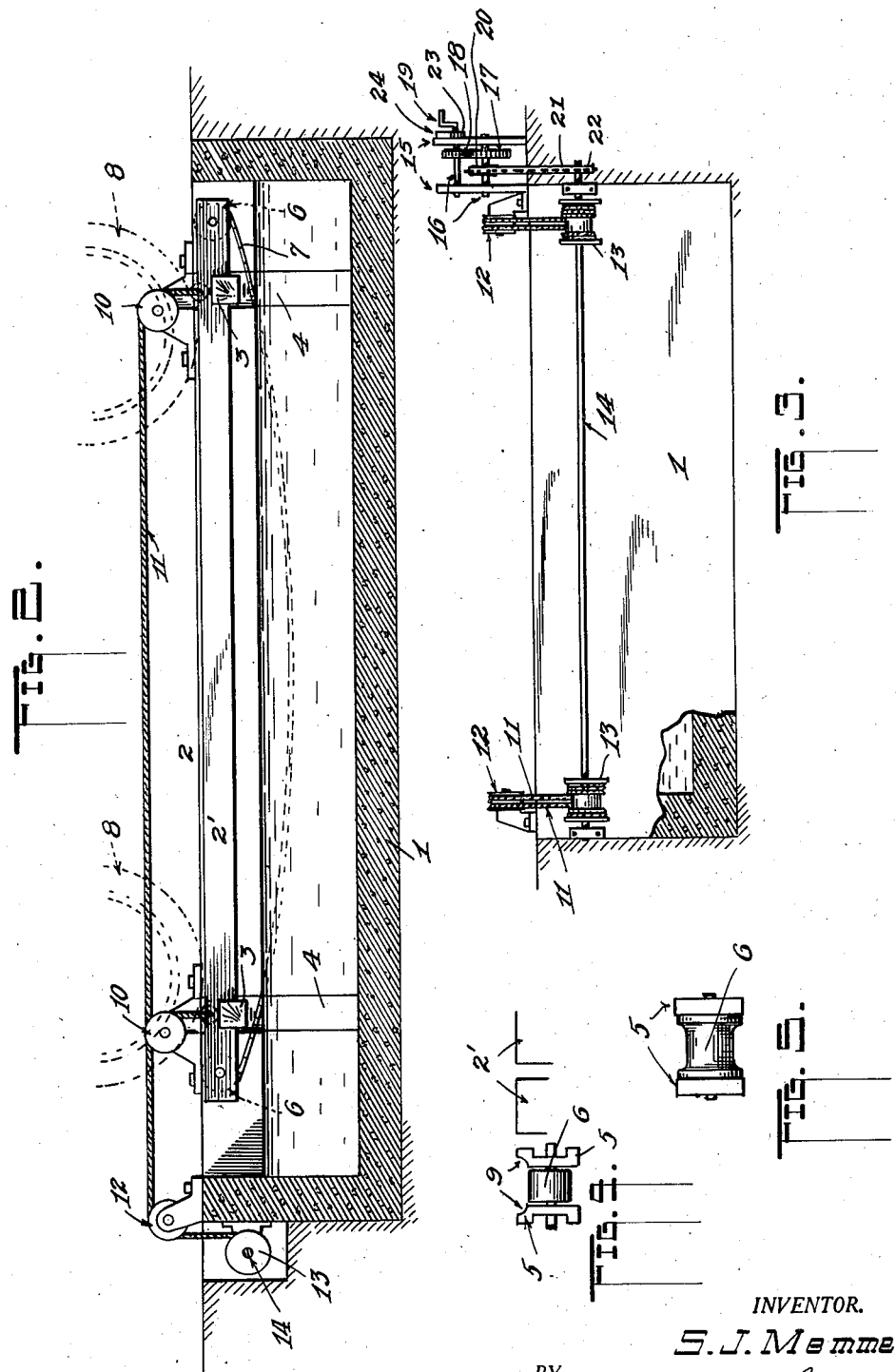

Patented Feb. 19, 1924.

1,484,071

UNITED STATES PATENT OFFICE.

SONIE J. MEMMEN, OF MANITO, ILLINOIS.

APPARATUS FOR USE IN WASHING AUTOMOBILES.

Application filed April 17, 1922. Serial No. 554,275.

*To all whom it may concern:*

Be it known that I, SONIE J. MEMMEN, a citizen of the United States, residing at Manito, in the county of Mason and State of Illinois, have invented new and useful Improvements in Apparatus for Use in Washing Automobiles; and I do hereby declare that the following is a full, clear, and exact description of the invention, which will enable others skilled in the art to which it appertains to make and use the same.

This invention relates to an apparatus for use in washing the gearing of automobiles.

An object of the invention is to provide a support for an automobile that may be lowered into a tank or vat containing water or other cleansing fluid, whereby the gearing of the vehicle can be easily washed of all adhering matter.
Another object of the invention is to furnish a platform having endless traveling members upon which to support the wheels of a power driven vehicle, said platform adapted to be immersed in a cleansing fluid, the rotation of the wheels of said vehicle acting to throw the fluid, whether water or other agent, upon the gearing for cleaning the same.

In the appended drawings, Figure 1 is a plan of a platform of my invention disposed in a tank or vat.

Figure 2 is a longitudinal vertical section of a tank or vat showing the platform of my invention suspended therein.
Figure 3 is an end elevation of the tank or vat showing lifting mechanism.

Figure 4 is an end elevation of certain members and a roller as parts of the platform shown in the first two figures, and Figure 5 is a similar view of another form of roller and supporting members therefor.

The whole purpose of my invention is that of furnishing a simple arrangement by which the thorough cleansing of the gearing of an automobile may be quickly and effectively accomplished.

Washing of vehicle gearing is very laborious and usually done in an unsatisfactory manner and at the expense of considerable time. And because of this I have devised the mechanism now to be described by which the washing may be done thoroughly in a few moments with but little labor.

In the figures, 1 designates a tank or vat of suitable material, preferably concrete, of a size interiorly that will admit of an automobile being lowered into it.

A platform is designated as a whole of the character 2. It may consist of two cross members 3 upon which planking 2' may be placed and secured in position. Preferably the ends of the cross members are let into vertical guideways 4 in the walls of the tank by which the platform will be guided in the vertical movement of which it partakes in use.

Near each edge of the platform, at its longest sides, is a pair of spaced members 5 between which is mounted a series of rollers 6 trained upon which is an endless traveling member 7 such as a belt, chain or their equivalent. Said rollers are placed as closely together as desired and they, together with the said belts or chains, form runways for the wheels 8 of the automobile to be washed.

The members 5 may be formed as shown in Figure 4, for example, wherein they are coved as at 9 so as to provide guides for holding the belt or chain upon the rollers. Or, as indicated in Figure 5, the rollers may be grooved for the same purpose, this being mere choice.

As it is my purpose to raise and lower the platform with the vehicle upon it there is provided mechanism for its operation while held in horizontal position at all times. That is to say, suitably mounted upon the walls of the tank or vat 1, above each guideway 4, is a grooved roller 10, a cable 11 being trained over each, one of the ends of each cable being attached in any desired manner to an end of the cross members 3, Figure 2.

The cables pass over other grooved rollers 12 at one end of the tank and then down upon drums 13 on a shaft 14 below the top level of the tank, there being means for operating the drums through which the vertical movement of the platform can be obtained. As an example, there may be mounted on the floor of the building, or other place of installation of the machine, a jack comprising frame members 15 in which are journaled two shafts 16 one carrying a gear 17, the other a pinion 18 to mesh therewith and operated by a crank 19, for instance.

The shaft having the gear 17 carries a sprocket-wheel 20 which, by means of a sprocket chain 21, drives a sprocket 22 on the shaft 14 of the drums. A ratchet wheel 23 on the pinion-shaft, and a pawl 24 on the frame 15 serve to maintain the mechanism in a desired position.

The tank or vat 1 is let into the driveway with its top flush therewith. When a car is to be washed it is driven upon the belts or chains of the platform and there anchored by attaching to its frame or its rear axle (neither of which is shown) one end of a chain or other member, the other end of which is attached to a convenient fixed object.

The jack is now operated to permit the platform with the car to descend into the water in the tank to the desired depth. Upon starting the engine or motor of the car and letting in the clutch, the rear wheels being thus rotated will operate the chains or belts 7 which in turn will rotate the forward wheels. The speed of rotation of the wheels and the depth of the car in the water will determine the extent to which the water is agitated and thrown upon the gearing to be washed. The wheels will throw the water in considerable quantities in all directions washing the parts thoroughly, including the undersides of the fenders.

Preferably a space is left between one end of the platform and one of the walls of the tank so that the latter may be cleaned from time to time. And the space may be bridged by any suitable means, as also the space having the drums 13, so that the vehicle may be advanced from the platform upon the washing being completed as may be understood.

It is not my purpose to be confined to the exact construction and arrangement shown, since changes may be readily made that will serve the purpose intended herein without departing from the spirit of the invention and scope of the claims.

I claim—

1. The combination of a tank, a platform therein having an endless traveling belt, and means to raise and lower the platform within said tank.

2. The combination of a tank for containing water, a platform suspended therein, an endless belt mounted on the platform adapted to travel, and means operatively connected to the platform for raising and lowering the same and extending outside said tank.

3. The combination of an open-top tank for containing a liquid, a platform therein carrying rollers free to turn, an endless belt carried by the rollers, and means to raise and lower the platform.

4. The combination of an open-top tank for containing a liquid, a platform in said tank having two series of rollers carried by said platform, the rollers of each series lying in one plane and free to rotate in that plane, a belt carried by each said series of rollers, and means to raise and lower the tank for immersing it in the liquid.

5. The combination with an open-top tank for containing a liquid, a platform in said tank adapted to support a vehicle to be washed, rollers journaled on the platform, a belt trained over said rollers adapted for receiving the wheels of the vehicle upon it, and means to raise and lower the platform.

6. The combination with an open top tank for containing a liquid, a platform in said tank capable of vertical movement therein, means to guide the platform in its movements, rollers mounted in the platform, a belt trained over the same adapted for supporting the wheels of a vehicle and capable of being driven by the frictional engagement of said wheels therewith, and means to impart vertical movement to the platform including an operating part therefor outside said tank.

In testimony whereof I affix my signature in presence of two witnesses.

SONIE J. MEMMEN.

Witnesses:
 JUDSON STARR,
 MAE MEMMEN.